United States Patent
Mai et al.

(10) Patent No.: US 12,386,973 B2
(45) Date of Patent: Aug. 12, 2025

(54) BUILD PROCESS SECURITY FRAMEWORK

(71) Applicant: Oracle International Corporation, Redwood Shores, CA (US)

(72) Inventors: Trong Nhan Mai, Brisbane (AU); Behnaz Hassanshahi, Brisbane (AU); Padmanabhan Krishnan, Brisbane (AU)

(73) Assignee: Oracle International Corporation, Redwood Shores, CA (US)

( * ) Notice: Subject to any disclaimer, the term of this patent is extended or adjusted under 35 U.S.C. 154(b) by 564 days.

(21) Appl. No.: 17/888,466

(22) Filed: Aug. 15, 2022

(65) Prior Publication Data

US 2024/0054232 A1 Feb. 15, 2024

(51) Int. Cl.
G06F 21/57 (2013.01)
G06F 8/10 (2018.01)
G06F 8/71 (2018.01)
G06F 11/3604 (2025.01)

(52) U.S. Cl.
CPC .............. *G06F 21/577* (2013.01); *G06F 8/10* (2013.01); *G06F 8/71* (2013.01); *G06F 11/3604* (2013.01)

(58) Field of Classification Search
CPC .......... G06F 8/10; G06F 8/71; G06F 11/3604; G06F 21/577
See application file for complete search history.

(56) References Cited

U.S. PATENT DOCUMENTS

| | | | |
|---|---|---|---|
| 7,559,080 B2 * | 7/2009 | Bhargavan | H04L 63/20 713/168 |
| 8,161,520 B1 * | 4/2012 | Brunette | G06F 21/50 726/1 |
| 8,176,320 B1 * | 5/2012 | Belanger | G06F 21/6218 713/168 |
| 8,402,444 B2 * | 3/2013 | Ball | G06F 8/43 717/124 |
| 8,495,703 B2 * | 7/2013 | King | G06F 8/75 726/1 |
| 8,819,820 B2 * | 8/2014 | Milman | H04L 63/1433 726/25 |
| 9,703,691 B1 * | 7/2017 | Yim | G06F 11/3684 |
| 10,826,788 B2 * | 11/2020 | Nagarajan | H04L 41/122 |
| 11,102,053 B2 * | 8/2021 | Ponnuswamy | H04L 43/04 |
| 2005/0251853 A1 * | 11/2005 | Bhargavan | H04L 63/08 726/1 |

(Continued)

OTHER PUBLICATIONS

Alberts, C.J. et al., "A Systemic Approach for assessing Software Supply-Chain Risk" Proceedings of the 44th Hawaii International Conference on System Sciences, Jan. 2011 (8 pages).

(Continued)

*Primary Examiner* — Douglas M Slachta
(74) *Attorney, Agent, or Firm* — Lathrop GPM LLP (57) ABSTRACT

A method includes receiving multiple security framework requirements, mapping the security framework requirements to a predicate, mapping the predicate to a system-specific implementation, evaluating, using a runtime system, the target system by analyzing a multitude of build files using the system-specific implementation, and presenting a report indicating whether the security framework requirements are satisfied.

20 Claims, 8 Drawing Sheets

(56) References Cited

U.S. PATENT DOCUMENTS

| | | | | |
|---|---|---|---|---|
| 2008/0184201 | A1* | 7/2008 | Burns | H04L 41/0894 717/121 |
| 2009/0070853 | A1* | 3/2009 | Chung | G06F 21/604 726/1 |
| 2019/0205542 | A1* | 7/2019 | Kao | G06F 8/10 |
| 2019/0297055 | A1* | 9/2019 | May | G06F 21/577 |
| 2020/0007584 | A1* | 1/2020 | Dixit | H04L 41/5019 |
| 2020/0177444 | A1* | 6/2020 | Nelson-Gal | H04L 41/0866 |
| 2023/0370452 | A1* | 11/2023 | Mannengal | H04L 41/12 |

OTHER PUBLICATIONS

Lamb, C. et al., "Reproducible Builds: Increasing the Integrity of Software Supply Chains", IEEE Computer Society, Software Engineering, Apr. 13, 2021 (10 pages).

Lowdermilk, J. et al., "Towards Zero Trust: An Experience Report", 2021 IEEE Secure Development Conference, Oct. 2021 (7 pages).

Apache Maven Dependency Plugin, "Dependency: Analyze", 2002-2022 The Apache Software Foundation (7 pages). https://www.apache.org/).

Meyers, J.S. "SLSA vs. Software Supply Chain Attacks", Chainguard, Mar. 15, 2022 (9 pages).

Nadgowda, S. et al., "Tapiseri: Blueprint to Modernize DevSecOps for Real World", ACM Proceedings 7th International Workshop on Container Technologies and Container Clouds, Dec. 2021 (6 pages).

github.com/cncf/tag-security, "Software Supply Chain Best Practices", Cloud Native Computing Foundation, May 2021 (45 pages).

Torres-Arias, S. et al., "In-Toto: Providing Farm-to-Table Guarantees for Bits and Bytes", 28th USENIX Security Symposium, Aug. 2019 (19 pages).

Vasilakis, N. et al., "Supply-Chain Vulnerability Elimination via Active Learning and Regeneration", Proceedings 2021 ACM SIGSAC Conference on Computer and Communications Security, Nov. 2021 (16 pages).

Vu, D. et al, "LastPyMile: Identifying the Discrepancy between Sources and Packages", Proceedings 29th ACM Joint European Software Engineering Conference and Symposium on the Foundations of Software Engineering, Aug. 2021 (16 pages).

* cited by examiner

REPORT
2022-04-08 15:27:51
Target Information

| | | Target System Information 580 |
|---|---|---|
| Full Name | projects-micronauts/core-micronaut | |
| Local cloned path | g:\somedirectory\projects\core-micronaut | |
| Remote path | https://github.com/projects-micronauts/core-micronaut | |
| Branch | 3.4.x | |
| Commit Hash | 30a425a00997crvc061132db96fb17a | |
| Commit Date | 2022-04-07 T 17:14:00 Z | |
| Build Tool | grad | |

Requirements status

| Name | Description | Category | Required from level | Is passing | Justification |
|---|---|---|---|---|---|
| Version Controlled | Every change to the source is tracked in a version control | Source | 2 | ✓ | xxxxxxxxxxxxxxxxxxxx |
| Scripted build | All build steps were fully defined in some sort of "build script". The only manual command, if any, was to invoke the build script. Example: - Build snpt is MakeFile, invoked via make all. - Build script is github/somedirectly.xml, invoked by GitHubActions. | Build | 1 | ✓ | yyyyyyyyyyyyyyyyyyyyyyyyyyyyyyyyyyxxxxxxxxxxxxxxxxxxxxxxx yyyyyyyyyyyyyyyyyyyyyyyyyyyyyyyyyyyyyyyyyyyyyyyy yyyyyyyyyyyyyyyyyyyy |
| Build service | All build steps ran using some build service, not on a developer's workstations. Example: GitHub Actions, Google Cloud Build, Travis CI. | Build | 2 | ✓ | xxxxxxxxxxxxxxxxxxxxxxxxxxxxxxxxxxxxxxxxxxxxxxxxxxyyyyyyyyyyyyyyyyyyyyyyyyyyyyyyyyyyyyyyyy xxxxxxxxxxxxxxxxxxxxxxxxxxxxxxxxx |
| Provenance Available | The provenance is available to the consumer in a format that the consumer accepts. The provenance format SHOULD be in - toto SLSA Provenance but another format MAY be used if both producer and consumer agree and it meets all the other requirements. | Provenance | 1 | ✗ | Could not find any in-toto metadata files. |

Justification 582

Dependencies result

| Build | Status | Description | Report |
|---|---|---|---|
| xxxxxxxxxxxxxxxxx | ✓ | Analysis Completed | Open report |
| yyyyyyyyyyyyyy | ✓ | Analysis Completed | Open report |

BUILD PROCESS SECURITY FRAMEWORK

BACKGROUND

Most large software systems are constructed using a variety of software products from different organizations, which may introduce unexpected vulnerabilities into the system. These vulnerabilities, called supply-chain vulnerabilities, may be introduced at any point of the software development life-cycle, such as the build, testing, and deployment processes. Several solutions have been proposed, including the Supply-chain Levels for Software Artifacts (SLSA) framework. The SLSA framework outlines the attack surface, which include source, build, and dependency threats, and proposes various solutions for each threat. SLSA defines different levels of maturity of the source and build integrity of the software system. When a third party software claims to meet a certain SLSA level, efficient verification of that claim for the software system and all its dependencies is challenging.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including receiving a plurality of security framework requirements, mapping the security framework requirements to a predicate, mapping the predicate to a system-specific implementation, evaluating, using a runtime system, the target system by analyzing a plurality of build files using the system-specific implementation, and presenting a report indicating whether the security framework requirements are satisfied.

In general, in one aspect, one or more embodiments relate to a system including a repository configured to store a target system. The target system includes build files and dependencies. The system further includes a framework, configured to receive a plurality of security framework requirements, map the security framework requirements to a predicate, map the predicate to a system-specific implementation, and present, using an output device, a report indicating whether the plurality of security framework requirements is satisfied. The system further includes a runtime system with a computer processor, configured to execute instructions to evaluate a target system by selecting the next system-specific implementation, analyzing a plurality of build files using the system-specific implementation, and repeating until no system-specific implementation remains.

In general, in one aspect, one or more embodiments relate to a method including receiving a plurality of security framework requirements, recursively executing a dependency analysis on a target system, mapping the security framework requirements to a predicate, and mapping the predicate to a system-specific implementation. The method further includes evaluating the target system by selecting the next system-specific implementation, analyzing a plurality of build files using the system-specific implementation, and repeating until no system-specific implementation for the target system or its dependencies remains. The method further includes presenting, using an output device, a report indicating whether the plurality of security framework requirements is satisfied for the target system and its dependencies.

Other aspects of the invention will be apparent from the following description and the appended claims.

BRIEF DESCRIPTION OF DRAWINGS

FIG. 5.1, FIG. 5.2, and FIG. 5.3 show examples in accordance with one or more embodiments of the invention.

FIGS. 6.1 and 6.2 show a computing system in accordance with one or more embodiments of the invention.

Like elements in the various figures are denoted by like reference numerals for consistency.

DETAILED DESCRIPTION

Specific embodiments will now be described in detail with reference to the accompanying figures. Like elements in the various figures are denoted by like reference numerals for consistency.

In the following detailed description of embodiments, numerous specific details are set forth in order to provide a more thorough understanding of the one or more embodiments. However, it will be apparent to one of ordinary skill in the art that the one or more embodiments may be practiced without these specific details. In other instances, well-known features have not been described in detail to avoid unnecessarily complicating the description.

As used herein, the term "connected to" contemplates multiple meanings. A connection may be direct or indirect. For example, computer A may be directly connected to computer B by means of a direct communication link. Computer A may be indirectly connected to computer B by means of a common network environment to which both computers are connected. A connection may be wired or wireless. A connection may be temporary, permanent, or semi-permanent communication channel between two entities. An entity is an electronic device, not necessarily limited to a computer.

In general, embodiments are directed to a method or system for build system analysis. The analysis may be based on analyzing the build files of a particular system and its dependencies to determine the security of the build process.

Figure 1:
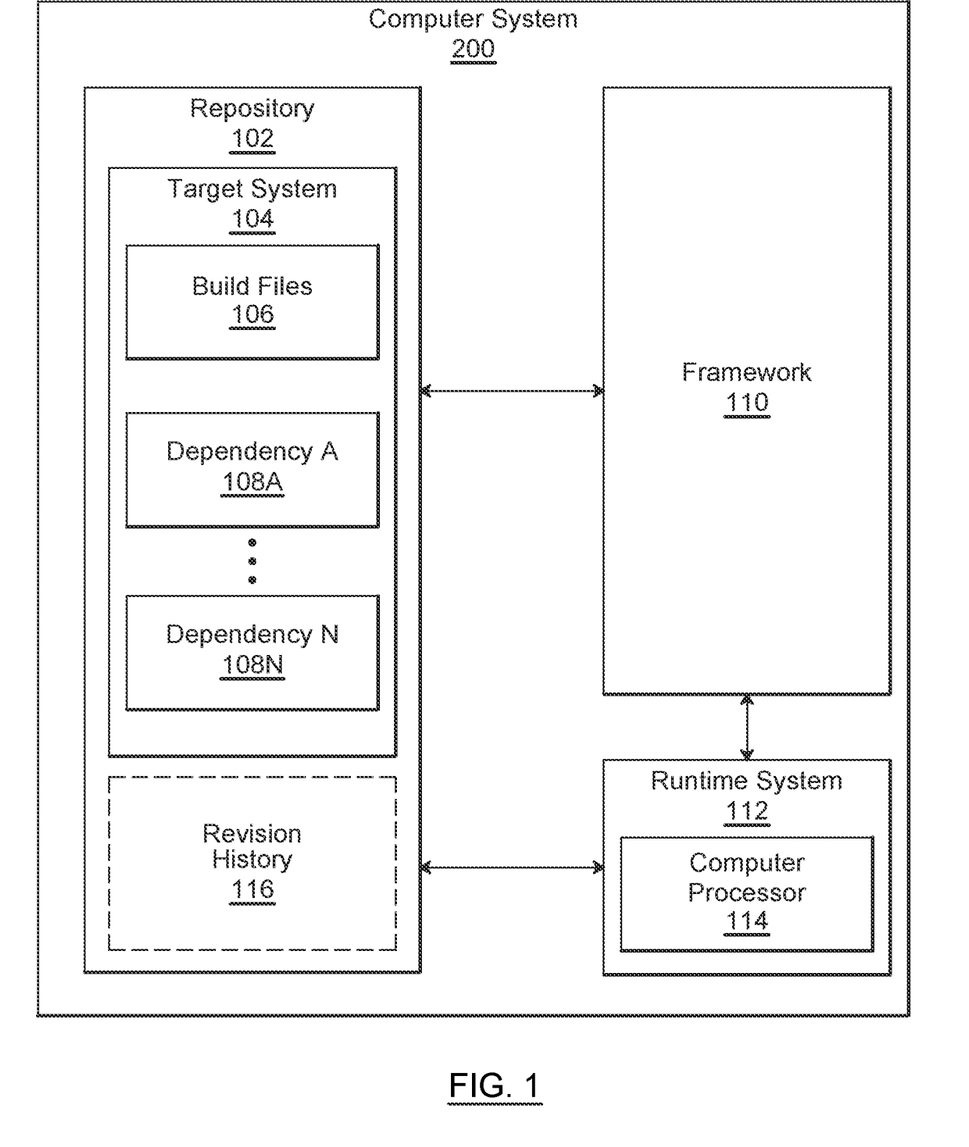
FIG. 1 and FIG. 2 show a system in accordance with one or more embodiments of the invention.
Figure 61:
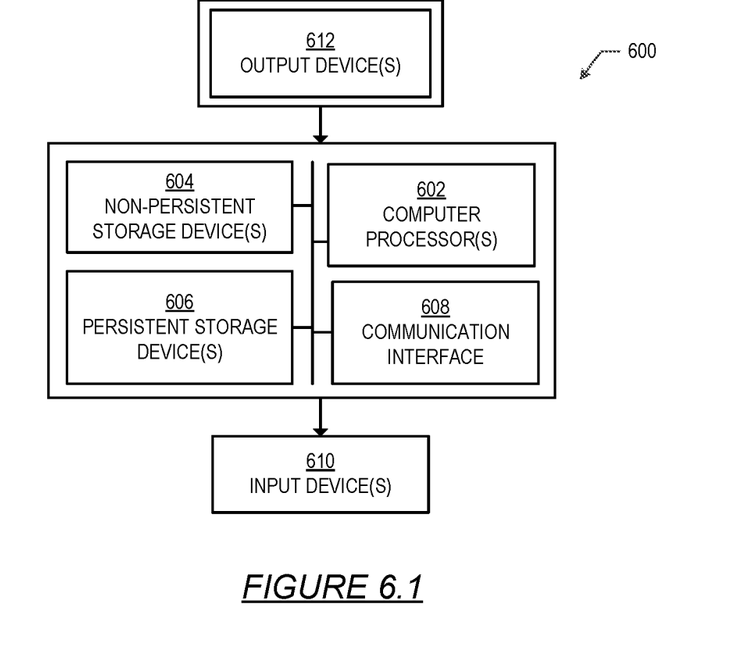
Figure 62:
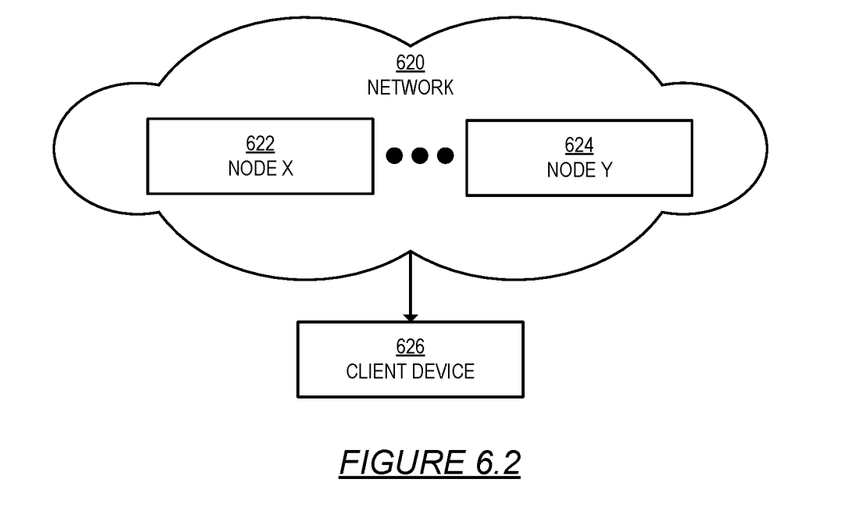

FIG. 1 shows a computer system (100) in accordance with one or more embodiments of the invention. As shown in FIG. 1, the computer system (100) includes a repository (102), a framework (110), and a runtime system (112). In one or more embodiments, the computer system (100) takes the form of the computing system (600) or similar described with respect to FIG. 6.1 and the accompanying description below, or takes the form of the client device (626) or similar described with respect to FIG. 6.2.

In one or more embodiments of the invention, the data repository (102) is any type of storage unit and/or device (e.g., a file system, database, data structure, or any other storage mechanism) for storing data. Further, the data repository (102) may include multiple different, potentially heterogeneous, storage units and/or devices.

In one or more embodiments, the repository (102) includes a revision history (116) and a target system (104). The revision history (116) may contain a history of all or a subset of changes to a repository (102). The revision history (116) may contain information about historical code commits, including at least timestamps, authors, and reviewers. The revision history (116) is not strictly necessary to check for build vulnerabilities but may be used to check that the target system meets certain security framework requirements (e.g., source requirements for SLSA).

In one or more embodiments, the target system (104) is the system being targeted for analysis. The target system (104) may be any collection of source code including various software components. That is, the target system (104) may be any collection of computer instructions written in a human readable programming language. The target system (104) may be transformed by a compiler into binary machine code. Compiled machine code may then be executed by a computer processor (e.g., contained in the computer system (100)) to execute the software components generated from the target system (104).

In one or more embodiments, the target system (104) includes build files (106) and dependencies (108a, 108n). In one or more embodiments, build files (106) define build rules for a particular system. For example, the build file (106) may contain descriptions of the software being built, a list of its dependencies (such as 108a, 108n), and its build order. The build file (106) may also contain information about the automation of the build process. Ultimately, the build file (106) ensures that the build process is well-defined. This automation may prevent vulnerabilities that could be introduced during the build process.

In one or more embodiments, dependencies (108a, 108n) are external code libraries or packages that the target system (104) calls upon. Dependencies (108a, 108n) may or may not be written by the same author as the rest of the target system (104). A dependency (e.g., 108n) presents a vulnerability to the target system (104) because an attacker may inject malicious programs into the dependency (e.g., 108n) which end up in the target system (104). In one or more embodiments, dependencies (108a, 108n) and their locations in the target system (104) may be listed in a software bill of materials (SBOM), the build files (106), or any file generated by a tool (not shown) that lists the dependencies (108a, 108n) and the locations.

Continuing with FIG. 1, in one or more embodiments, the runtime system (112) may be implemented in hardware (e.g., circuitry), software, firmware, and/or any combination thereof. The runtime system (112) may execute the target system (104) on a computer processor (114). The computer processor (114) may take the form of the computer processor (602) described in FIG. 6.1.

Continuing with FIG. 1, in one or more embodiments, a framework (110) may be implemented in hardware (e.g., circuitry), software, firmware, and/or any combination thereof. The framework (110) is described in FIG. 2.

Figure 2:
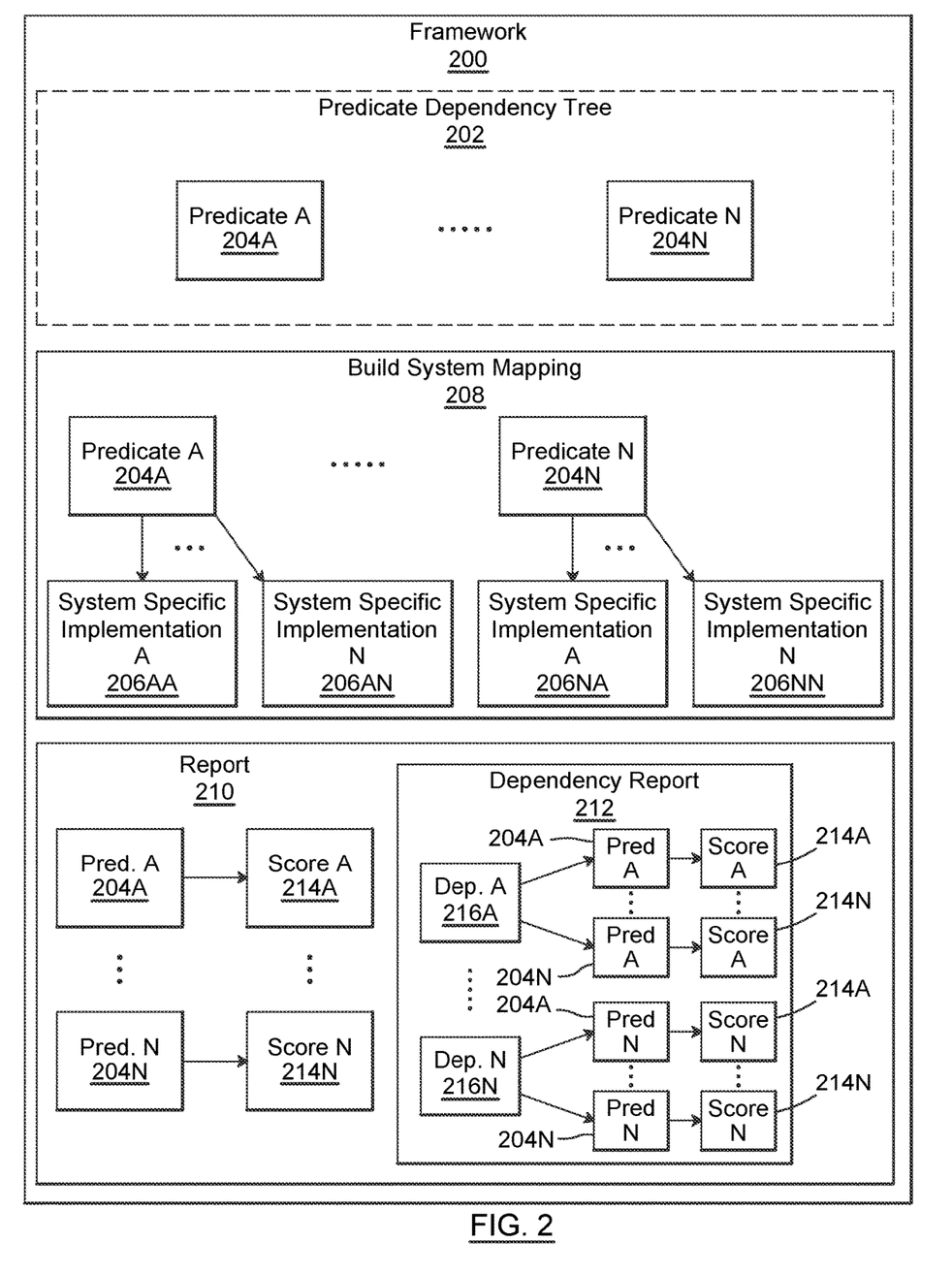

In one or more embodiments, the framework (200) includes a predicate dependency graph (202), build system mappings (208), and a report (210). In one or more embodiments, the predicate dependency graph (202) contains a set of predicates (204a, 204n). In one or more embodiments, the predicates (204a, 204n) may be atomic functionalities that map to specific security framework requirements. Multiple predicates (204a, 204n) may map to the same security framework requirement. Predicates (204a, 204n) are abstract representations of atomic aspects of a security framework requirement and do not contain system-specific implementations. For example, if the security framework requirement is that the target system (104) requires a scripted build, the corresponding predicate (204n) would be hasBuildScript. This predicate (204n) describes a generic property of a build system, but the system-specific implementation would lie in the build system mapping (208). The predicate (204n) may also have a hierarchical relationship with other predicates (204a, 204n), which aids in constructing the predicate dependency graph (202).

In one or more embodiments, the predicate dependency graph (202) may be any data structure that arranges the predicates (204a, 204n) to represent the hierarchical relationship between predicates (204a, 204n). The predicate dependency graph (202) is not strictly necessary for the functionality of the system but aids in the efficiency of the framework (200). The predicate dependency graph (202) allows the framework (200) to avoid unnecessary evaluations by leveraging the fact that many high-level security framework properties satisfy lower-level security framework properties. For example, if the target system (104) uses some build service, then the target system (104) has a build script. Thus, the framework (200) finds that that the target system (104) uses a build service implies, then there is no need to check the predicate hasBuildScript. The predicate dependency graph (202) may model this hierarchy by representing the relationships with a directed graph.

Continuing with FIG. 2, in one or more embodiments, the build system mapping (208) may be a data structure that contains a mapping between each predicate (204n) and its corresponding set of system-specific implementations (e.g., 206aa, 206an, 206na, 206nn). For each predicate (204n), an implementation (206nn) exists for all relevant build systems. When the user (not shown in FIG. 2) selects specific predicates (e.g., 204a, 204n) and the build system, the build system mapping (208) selects the system-specific implementation (e.g., 206aa, 206an, 206na, 206nn). The system-specific implementation (e.g., 206aa, 206an, 206na, 206nn) is a software tool that tests whether the target system (104) satisfies the predicate. The system-specific implementation (e.g., 206aa, 206an, 206na, 206nn) is configured to test target systems (110) with a particular build system (e.g., Gradle or Maven).

Continuing with FIG. 2, in one or more embodiments, the framework (200) may be configured to generate the report (210). The report (210) may be stored as a document capable of being accessed by an interested entity (e.g., a programmer). The report contains predicates (204a, 204n), corresponding scores (214a, 214n), and a dependency report (212). In one or more embodiments, predicates (204n) are assigned scores (214n) based on the security framework, which may be determined by the system-specific implementation (206nn). For example, the score (214n) may indicate which SLSA level the target system (104) meets. Rather than the course-grained levels assigned by the SLSA standard, these scores (214a, 214n) may offer more insight into the level of security for each SLSA requirement, which are represented by predicates (204a, 204n). In one or more embodiments, the dependency report (212) may contain a list of dependencies (108a, 108n) and corresponding scores (214a, 214n) for each predicate (204a, 204n). Relationships between the predicates (204a, 204n) and scores (214a, 214n) may be structured similarly to the structure of the report (210).

While FIG. 1 and FIG. 2 show a configuration of components, other configurations may be used without departing from the scope of the invention. For example, various components may be combined to create a single component. As another example, the functionality performed by a single component may be performed by two or more components.

Figure 3:
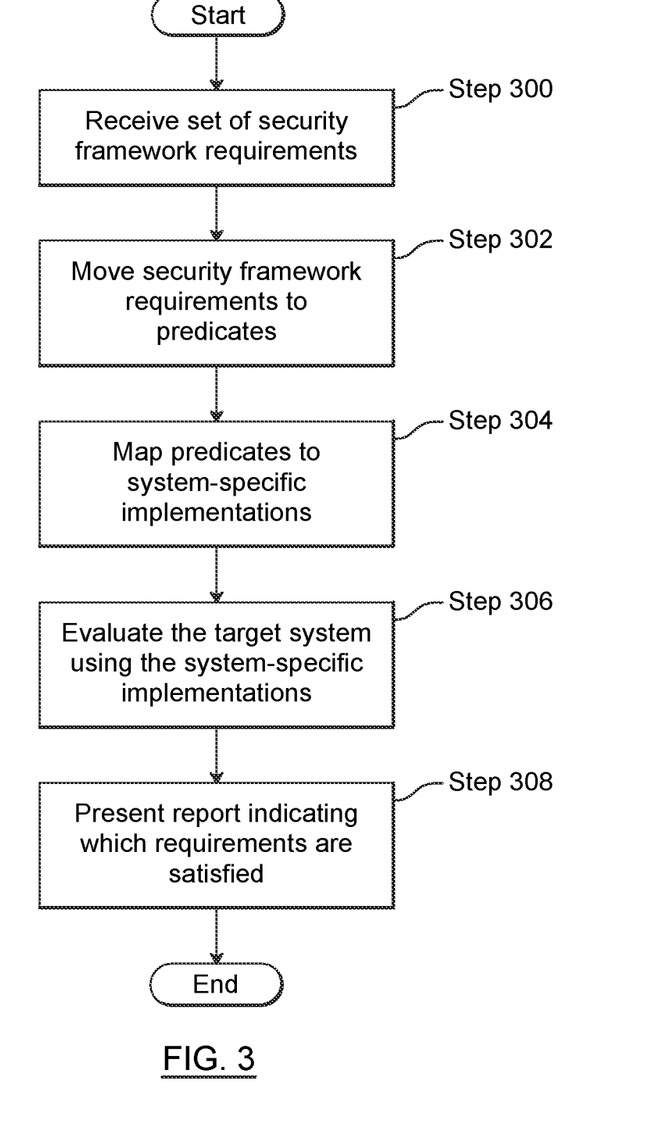
FIG. 3 and FIG. 4 show flowcharts in accordance with one or more embodiments of the invention.

FIG. 3 shows a flowchart in accordance with one or more embodiments of the invention. The flowchart depicts a process for build system analysis. One or more of the steps in FIG. 3 may be performed by the components (e.g., the framework (110) or the runtime system (112)) of the computer system (100), discussed above in reference to FIG. 1. While the various steps in this flowchart are presented and described sequentially, at least some of the steps may be executed in different orders, may be combined or omitted, and at least some of the steps may be executed in parallel. Furthermore, the steps may be performed actively or passively.

In Step 300, a set of security framework requirements is received by the system. In one or more embodiments, the set of requirements is chosen by the user. The user may select from any requirements that are derived from a security framework.

In Step 302, the security framework requirements are mapped to predicates. This step breaks down the requirements into logical representations of security properties, without being tied to any particular build system. The use of predicates allows the framework to have multiple system-specific implementations.

In Step 304, the predicates are mapped to a system-specific implementation. The system-specific implementations evaluate whether the predicate is satisfied in the target system. The system-specific implementations may only be accurate for target systems that use the specified build system.

In Step 306, the target system is evaluated using the system-specific implementations. The system-specific implementation does not execute, run, or build the target system; instead, the implementation analyzes the contents of the build files. The results or output of the system-specific implementation is the score, which signifies whether the code satisfies the predicate. A score for each of the predicates is obtained, either by executing the system-specific implementations on the target system or inferring the score from the score of another predicate using the predicate dependency graph. A recursive evaluation of the dependencies of the target system may also be performed, which is described more fully in Step 418 below.

In Step 308, a report is presented by the framework to indicating the scores for each security framework requirement of the target system. The report may also contain scores for the dependencies of the target system. The user may use this report to determine the security of the build process of the target system across many security framework requirements. For example, the standard SLSA scoring returns a single score, or level, for the target system, which may not provide enough insight into the status of the specific SLSA requirements (e.g., source, build, and provenance requirements). The report offers a more wholistic analysis, offering a score for each SLSA requirement. Further, the report may be a heatmap indicating the maturity of various aspects of the build process for the target system.

Figure 4:
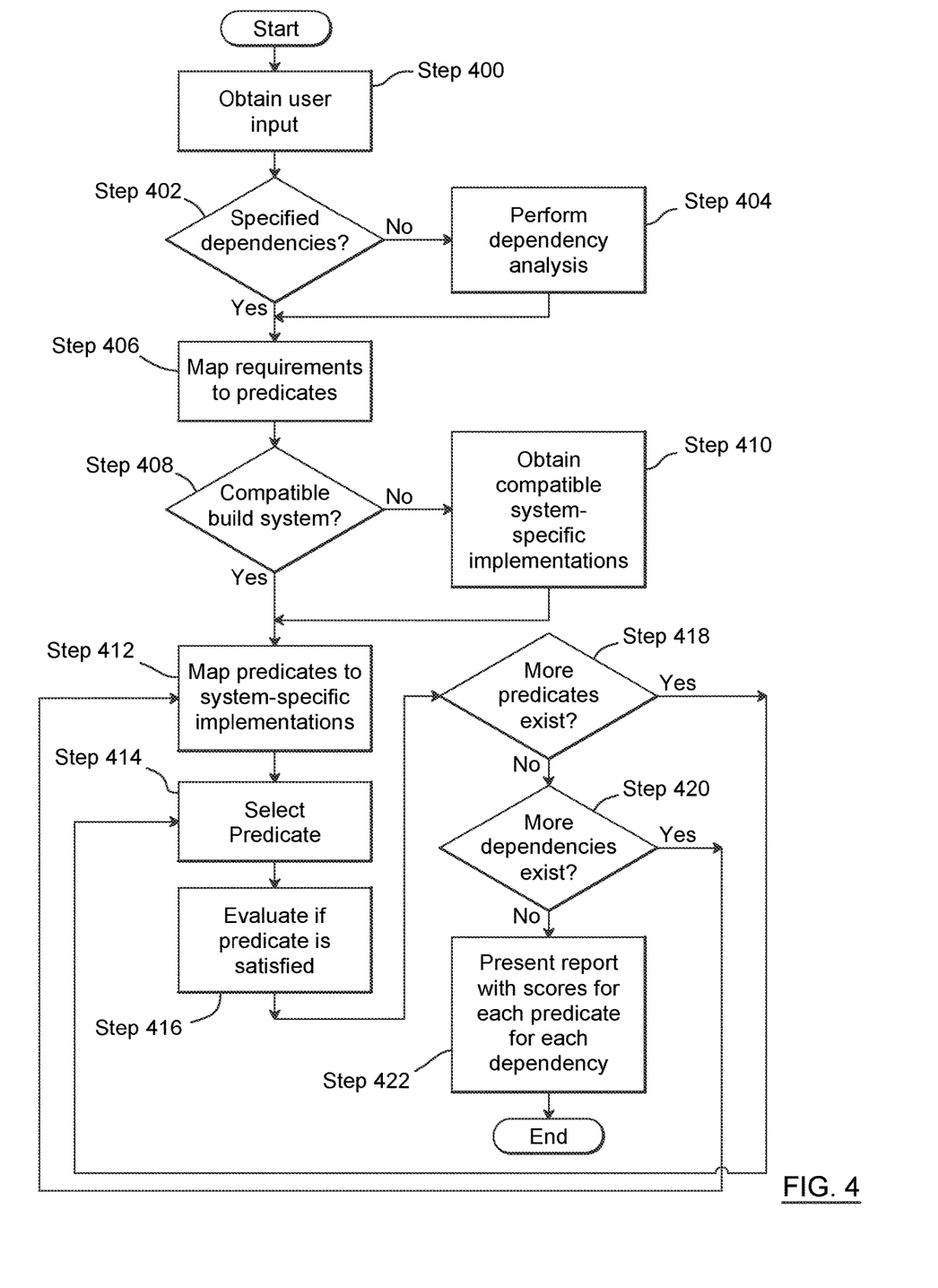

FIG. 4 shows a flowchart in accordance with one or more embodiments of the invention. The flowchart depicts a process for build security analysis that provides more detail about the steps described in FIG. 3. One or more of the steps in FIG. 4 may be performed by the components (e.g., the framework (110) or the runtime system (112)) of the computer system (100), discussed above in reference to FIG. 1. While the various steps in this flowchart are presented and described sequentially, at least some of the steps may be executed in different orders, may be combined or omitted, and at least some of the steps may be executed in parallel. Furthermore, the steps may be performed actively or passively.

In Step 400, user input is obtained. In one or more embodiments, user input includes a set of security framework requirements and a target system. The input may also include a specification of dependencies and their locations.

If, in Step 402, a determination is made that no dependencies are specified, then Step 404 is executed. Otherwise, the process proceeds to Step 406.

In Step 404, a dependency analysis is performed. In one or more embodiments, the dependency analysis may use any technique that generates a software bill of materials (SBOM) and indicates the location of the dependencies. For example, tools such as the Maven Dependency Plugin may be used. In accordance with a zero-trust model of the framework, the dependencies (either manually specified or programmatically generated) are verified to contain only the dependencies specified in the SBOM.

In Step 406, the security framework requirements are mapped to predicates, as described in Step 302. In one or more embodiments, the predicates may be stored in a predicate dependency graph to represent the relationships between predicates to optimize the evaluation process. Because a user may choose which predicates to evaluate, the predicate dependency graph can dynamically decide which predicates need to be evaluated for the target system. The predicate dependency graph may be structured such that if predicate A satisfies predicate B, then there is a directed edge from predicate A to predicate B. One skilled in the art will appreciate that any technique may be used to implement this process as long as the precedence requirements are satisfied.

If, at Step 408, it is found that the build system of the target system is incompatible with the system-specific implementations available in the build system mapping, then Step 410 is executed. Otherwise, the process proceeds to Step 412.

In Step 410, for each predicate, compatible system-specific implementations are obtained from the user. These user-created implementations may be seamlessly integrated into the framework by adding the implementations to the build system mappings.

In Step 412, the predicates are mapped to system-specific implementations using the build system mappings, as described in Step 304.

In Step 414, a predicate is selected. In one or more embodiments, the predicate may be selected based on the predicate dependency graph. The predicate may be selected if it has no incoming directed edges or all incoming directed edges come from unsatisfied predicates. This process ensures that the predicate has not already been implicitly evaluated.

In Step 416, the predicate is evaluated using the system-specific implementation. In one or more embodiments, the system-specific implementation is executed on the computer processor in the runtime system. The implementation may access build files, revision history, or other configuration files to evaluate whether the predicate is satisfied. The implementation does not, however, execute the target system to perform the analysis. The output of this evaluation may be a binary value which indicates if the predicate is satisfied.

If, in Step 418, there exists more predicates to check for the current target system or dependency, return to Step 414. Otherwise, proceed to Step 420.

If, in Step 420, there exists more dependencies to evaluate, return to Step 412 to map the predicates to system-specific implementations. The dependencies may have different build systems than the target system, so the predicates are re-mapped to the particular build system of the dependency. Otherwise, proceed to Step 422.

Finally, in Step 422, a report is presented to a user. In one or more embodiments, a table of predicates and scores is generated in the report file. Within the report, there may also be a dependency report, which includes a table of the predicates and scores for each of the dependencies. The tables may contain other information, such as a description of the predicate and why the predicate may not be satisfied.

The following example is for explanatory purposes only and not intended to limit the scope of the invention. Suppose that a user wanted to check the build security of a new software system Éclair, which uses a Maven build and a Git repository. The user uploads Éclair, including all configuration files, to the build security framework. The user also may specify a few SLSA requirements to evaluate. For example, the user may choose four SLSA requirements: all revision history of Éclair is verified (Requirement A), Éclair builds as code (Requirement B), Éclair has a scripted build (Requirement C), and Éclair specifies its provenance (Requirement D).

Because the user did not specify any dependencies of Éclair, the build security framework performs a dependency analysis on Éclair using the Maven Dependency Plugin. The results of this analysis find that Éclair has two dependencies, Croissant and Baguette. Croissant uses a Maven build, and Baguette uses a Gradle build. Neither dependency has dependencies of their own, so the dependency analysis ends.

Figure 51:
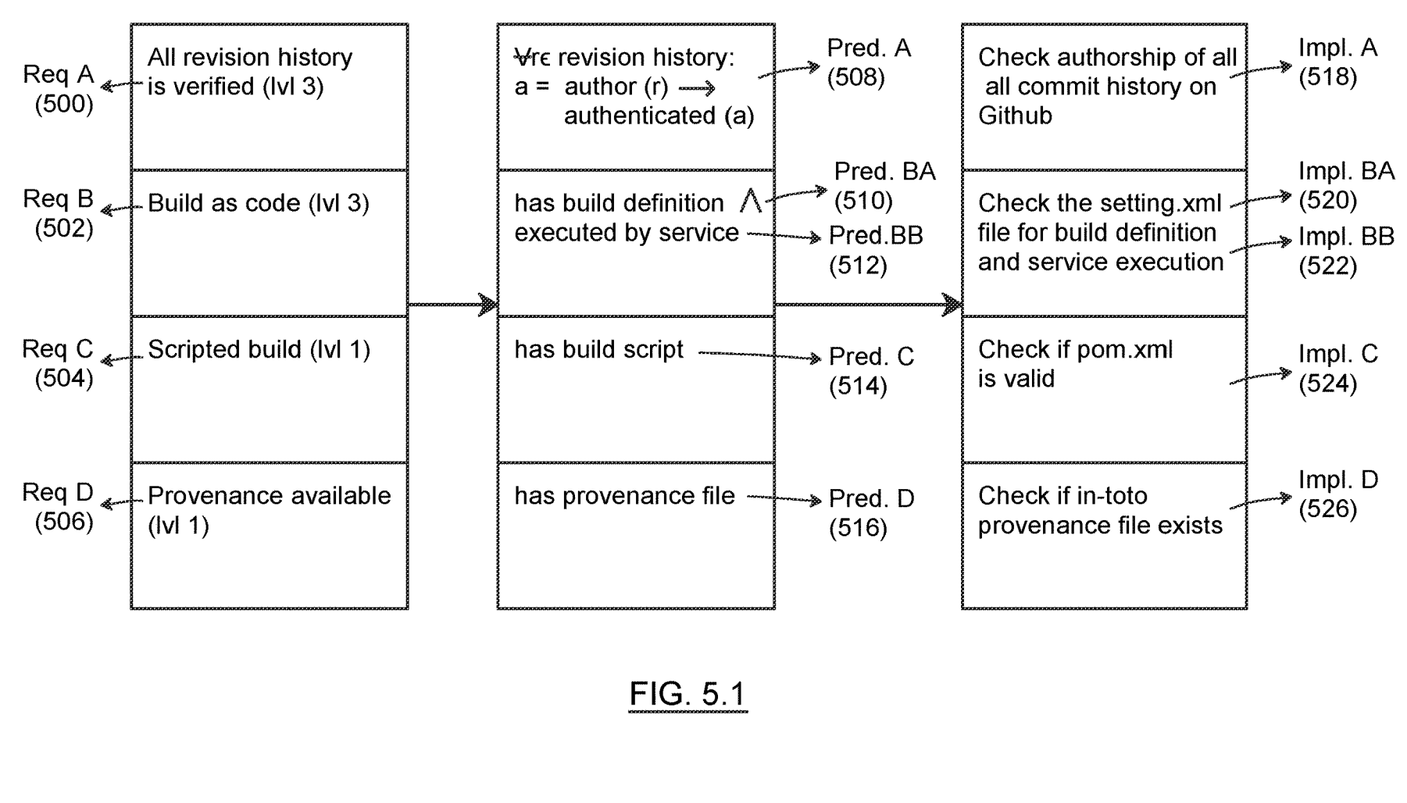

Next, the specified requirements are mapped to predicates, and then mapped to system-specific implementations. FIG. 5.1 shows this process for Requirement A (500), Requirement B (502), Requirement C (504), and Requirement D (506), as described above. Requirement A (500) maps to Predicate A (508), which is the logical representation of Requirement A (500): for all edits in the revision history, every author of each edit must be authenticated. Requirement B (502) maps to both Predicate BA (510) and Predicate BB (512). Requirement B (502) maps to two predicates because it contains two separate properties that must be checked: a build definition must exist and the build definition must be executed by a service. Requirement C (504) maps to Predicate C (514), which verifies that there exists a valid build script. Lastly, Requirement D (506) maps to predicate D (516), which verifies that a provenance file exists.

After the requirements are mapped to predicates, a predicate dependency graph (not shown) is created. In this example, a dependency exists between the predicates for Predicates BA (510), BB (512), and C (514). If the target system builds as code, then the target system has a scripted build. In particular, if the target system has a build definition or is executed by a service, then the target system has a scripted build required. Thus, there is an edge from Predicate BA (510) to Predicate C (514) and another edge from Predicate BB (512) to Predicate C (514).

Continuing with FIG. 5.1, the predicates are now mapped to system specific implementations. Because Éclair uses Maven and Git, the implementations are specific to these tools. Predicate A (508) maps to Implementation A (518), which checks that the complete commit history of Éclair using Github. Predicate BA (510) and BB (512) map to Implementation BA (520) and BB (522), which specify that the settings.xml file must be checked to ensure that the necessary configurations exist. Predicate C (514) maps to Implementation C (524), which checks if the pom.xml file is valid. Lastly, Predicate D (516) maps to Implementation D (526), which checks if an in-toto provenance file exists.

More generally, if the user were to select other SLSA requirements for the build system, the system-specific implementations for Maven may access the settings.xml file for entry configurations, the pom.xml file for build configurations, and mvn or mvnw for build commands.

Next, Éclair is evaluated using the system-specific implementations. To evaluate the target system in a zero-trust format, the repository is cloned, and the relevant build-related instructions are invoked to evaluate the requirements.

The order of the evaluations of the predicates may be determined from the predicate dependency graph. Any predicate, except Predicate C (514), may be selected first. Suppose Predicate BA (510) is evaluated first, and found to be satisfied using Implementation BA (520) Similarly, Predicate BB (512) is found to be satisfied. Thus, Predicate C (514) is inferred to be satisfied. Lastly, Predicate D (516) is evaluated and found to not be satisfied. This completes the execution for Éclair.

Because Éclair contains two dependencies, Croissant and Baguette, each dependency is evaluated using the same process above. The recursive evaluation of dependencies allows the evaluation of many dependencies, which may be of varying builds. Because Croissant uses Maven, its evaluation would be similar to the evaluation of Éclair. Following the above process, each predicate is evaluated using its system-specific implementation and found to be satisfied.

In this example, Baguette has a Gradle build, so different system-specific implementations are used. In particular, Implementations BA (520), BB (522), and C (524) are modified to evaluate a system using a Gradle build. Note that only the implementations change; the predicates remain the same. Specifically, for Implementations BA (520) and BB (522), the Gradle init scripts are evaluated instead of the settings.xml file. For Implementation C (524), the validity of the build.gradle file are evaluated, rather than the pom.xml file. After these modifications, the Baguette dependency is evaluated for each predicate. Once again, each predicate is evaluated using its system-specific implementation and found to be satisfied. After this analysis, a report is generated, containing the results of the target system and links to reports for each of the dependencies.

Figure 52:
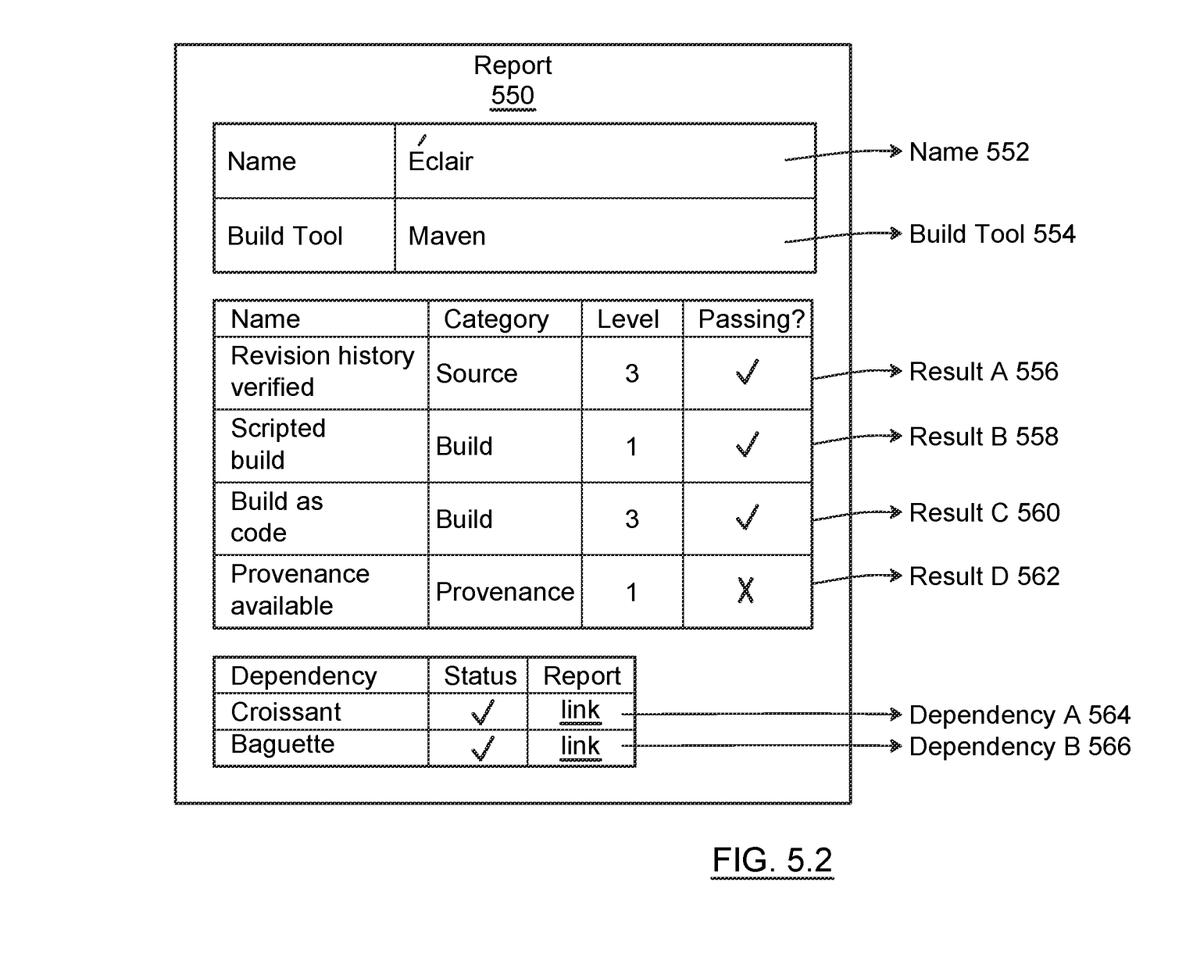

FIG. 5.2 shows an exemplary report that contains the results of an evaluation. The report (550) contains the name of the target system (552) and the build tool (554). In this example, the name (552) is Éclair and the build tool (554) is Maven. The report (550) also contains a results table, with a row for each result (556, 558, 560, 562). The table has a column for the name of the SLSA requirement, the category of requirement, the SLSA level associated with the requirement, and whether the requirement is satisfied by the target system. For example, Result A (556) shows that all revision history is verified for Éclair, which is a Level 3 Source requirement for SLSA. Result B (558) and Result C (560) also show that the Level 1 and 3 Build requirements were met. Result D (562) is an example of an unsatisfied requirement. These rows create a "heatmap" of results that indicate the SLSA levels for each category, rather than produce a single, granular score. For example, Result D (562), a Level 1 requirement, is not satisfied, which implies that Éclair does not even meet SLSA Level 1. However, this "heatmap" provides a more nuanced view of the maturity of the build process of the program, including the fact that the target system satisfies Level 3 of the SLSA build requirements.

Beneath the results table is a list of dependencies, where each entry lists the name of the dependency, its evaluation status, and a link to its own report. After a user clicks the link, a similar report appears, but with the results for the dependency.

Figure 53:
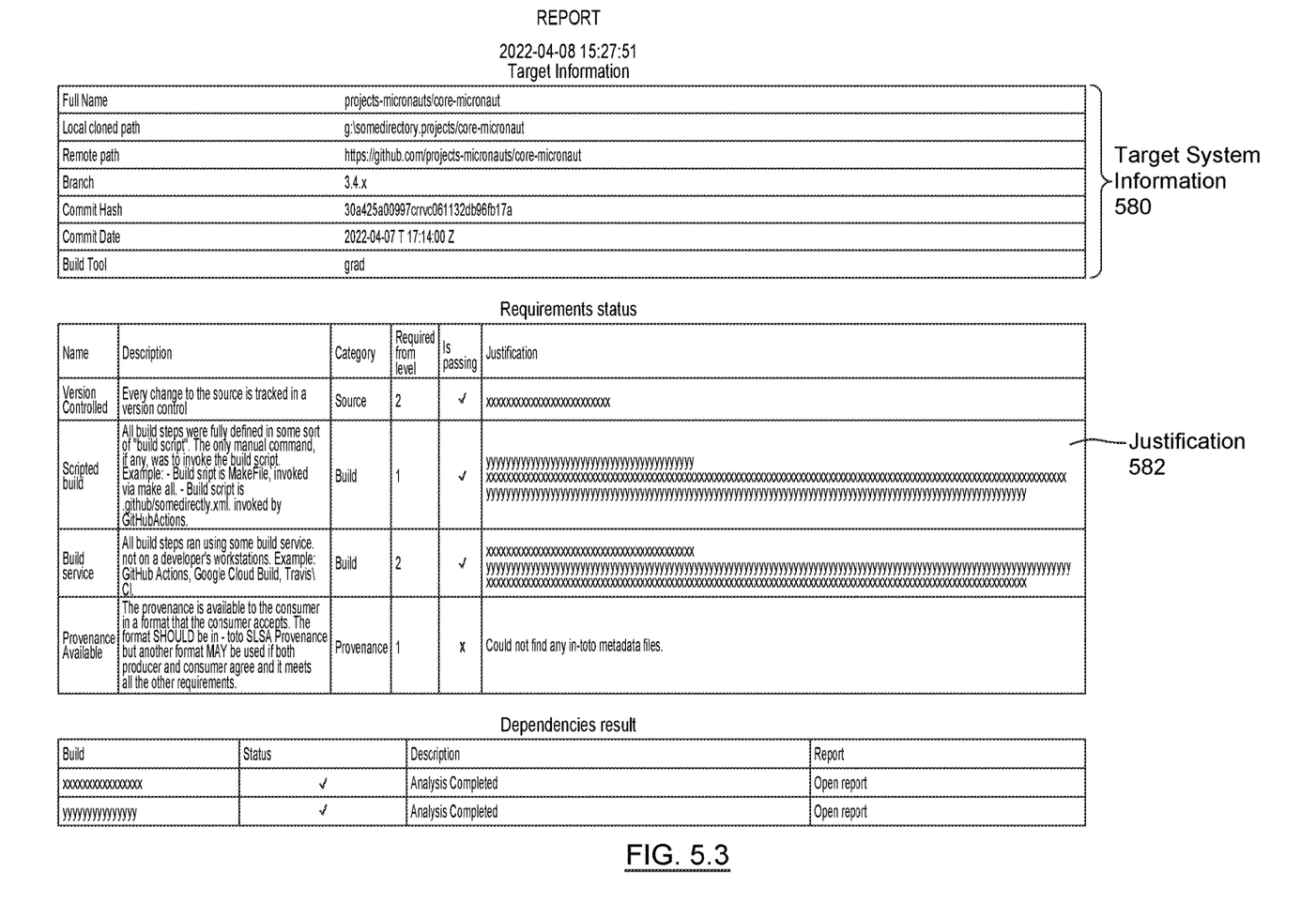

FIG. 5.3 shows a more complex report for a different system, which presents additional information to the user. The report shares more target system information (580), such as the remote path, the branch, and other Git repository information. This report also contains a justification (582) for why a requirement is satisfied or unsatisfied.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

For example, as shown in FIG. 6.1, the computing system (600) may include one or more computer processors (602), non-persistent storage (604), persistent storage (606), a communication interface (612) (e.g., Bluetooth interface, infrared interface, network interface, optical interface, etc.), and numerous other elements and functionalities that implement the features and elements of the disclosure. The computer processor(s) (602) may be an integrated circuit for processing instructions. For example, the computer processor(s) may be one or more cores or micro-cores of a processor. The input devices (610) may include a touchscreen, keyboard, mouse, microphone, touchpad, electronic pen, or any other type of input device. The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the output devices (608) may include a display device, a printer, external storage, or any other output device. One or more of the output devices may be the same or different from the input device(s). The input and output device(s) may be locally or remotely connected to the computer processor(s) (602). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (600) in FIG. 6.1 may be connected to or be a part of a network. For example, as shown in FIG. 6.2, the network (620) may include multiple nodes (e.g., node X (622), node Y (624)). Each node may correspond to a computing system, such as the computing system shown in FIG. 6.1, or a group of nodes combined may correspond to the computing system shown in FIG. 6.1. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (600) may be located at a remote location and connected to the other elements over a network.

The nodes (e.g., node X (622), node Y (624)) in the network (620) may be configured to provide services for a client device (626), including receiving requests and transmitting responses to the client device (626). For example, the nodes may be part of a cloud computing system. The client device (626) may be a computing system, such as the computing system shown in FIG. 6.1. Further, the client device (626) may include and/or perform all or a portion of one or more embodiments of the invention.

The computing system of FIG. 6.1 may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. While the one or more embodiments have been described with respect to a limited number of embodiments, those skilled in the art, having benefit of this disclosure, will appreciate that other embodiments can be devised which do not depart from the scope of the one or more embodiments as disclosed herein.

Further, other embodiments not explicitly described above can be devised which do not depart from the scope of the invention as disclosed herein. Accordingly, the scope of the invention should be limited only by the attached claims.

What is claimed is:

1. A method for analyzing a build process, comprising:
receiving a plurality of security framework requirements;
mapping one of the plurality of security framework requirements to at least one predicate;
mapping the at least one predicate to a set of system-specific implementations;
evaluating a target system by:
selecting the system-specific implementation of the set of system-specific implementations, executing the selected system-specific implementation on a computer processor in a runtime system of the target system to evaluate whether a plurality of build files satisfy the at least one predicate, and repeating until no system-specific implementation of the set of system-specific implementations remains; and presenting, using an output device, a report indicating whether the plurality of security framework requirements is satisfied.

2. The method of claim 1, wherein presenting the report comprises presenting a heatmap indicating whether each security framework requirement is satisfied.

3. The method of claim 1, wherein evaluating the target system further comprises:

recursively executing a dependency analysis of the target system, and analyzing the plurality of build files using the system-specific implementation for each dependency.

4. The method of claim 1, wherein presenting the report comprises indicating whether the plurality of security framework requirements is satisfied for a dependency.

5. The method of claim 1, wherein evaluating the target system further comprises:

selecting the system-specific implementation by evaluating a relationship between system-specific implementations using a predicate dependency graph.

6. The method of claim 1, wherein evaluating the target system further comprises: analyzing a revision history of the target system using the system-specific implementation.

7. The method of claim 1, further comprising:

creating the report based on the results of evaluating the target system using the system-specific implementations.

8. The method of claim 1, wherein the plurality of security framework requirements comprises of Supply-chain Levels for Software Artifacts (SLSA).

9. A system for analyzing a build process, comprising:

a framework configured to:

receive a plurality of security framework requirements;

map one of the plurality of security framework requirements to at least one predicate;

map the at least one predicate to a set of system-specific implementations; and present, using an output device, a report indicating whether the plurality of security framework requirements is satisfied;

a repository, communicatively connected to the framework and configured to store a target system, comprising of a plurality of build files and a dependency; and a runtime system, comprising a computer processor configured to execute instructions to perform:

evaluating the target system by:

selecting the next system-specific implementation of the set of system-specific implementations, executing the selected system-specific implementation on the computer processor in the runtime system to evaluate whether the plurality of build files satisfy the at least one predicate, and repeating until no system-specific implementation of the set of system-specific implementations remains.

10. The system of claim 9, wherein the framework is further configured to present a report that presents a heatmap indicating whether each security framework requirement is satisfied.

11. The system of claim 9, wherein the runtime system is further configured to evaluate the target system that:

recursively executes a dependency analysis of the target system, and analyzes the plurality of build files using the system-specific implementation for each dependency.

12. The system of claim 9, wherein the framework is further configured to present the report that indicates whether the plurality of security framework requirements is satisfied for a dependency.

13. The system of claim 9, wherein the runtime system is further configured to evaluate the target system further that selects the next system-specific implementation by evaluating a relationship between system-specific implementations using a predicate dependency graph.

14. The system of claim 9, further comprising:

a revision history comprising a history of edits to the target system, an author of the history of edits, and an approver of the history of edits.

15. The system of claim 14, wherein the framework is further configured to analyze the revision history of the target system using the system-specific implementation.

16. The system of claim 9, wherein the framework is further configured to create the report based on the results of evaluating the target system using the system-specific implementations.

17. A method for analyzing a build process, comprising:

receiving a plurality of security framework requirements;

recursively executing a dependency analysis on a target system;

mapping one of the plurality of security framework requirements to at least one predicate;

mapping the predicate to a set of system-specific implementations;

evaluating the target system by:

selecting the next system-specific implementation of the set of system-specific implementations, executing the selected system-specific implementation on a computer processor in the runtime system of the target system to evaluate whether a plurality of build files satisfy the at least one predicate, and repeating until no system-specific implementation, of the set of system specific implementations, for the target system or dependencies remains; and presenting, using an output device, a report indicating whether the plurality of security framework requirements is satisfied for the target system and dependencies.

18. The method of claim 17, wherein presenting a report comprises presenting a heatmap indicating whether each security framework requirement is satisfied.

19. The method of claim 17, wherein selecting the next system-specific implementation further comprises evaluating a relationship between system-specific implementations using a predicate dependency graph.

20. The method of claim 17, further comprising:

creating the report based on the results of evaluating the target system using the system-specific implementations.

* * * * *